United States Patent
Stiegler et al.

[19]

[11] Patent Number: 5,936,969
[45] Date of Patent: Aug. 10, 1999

[54] METHOD FOR COMPENSATING FOR PROPAGATION TIME DELAYS IN AN ANNULAR COMMUNICATION NETWORK

[75] Inventors: Andreas Stiegler, Ettlingen; Patrick Heck, Durmersheim; Herbert Hetzel, Schwaigen, all of Germany

[73] Assignees: Silicon Systems GmbH Multimedia Engineering, Karlsruhe; Becker GmbH, Karlsbad, both of Germany

[21] Appl. No.: 08/949,655

[22] Filed: Oct. 14, 1997

[30] Foreign Application Priority Data

Oct. 11, 1996 [DE] Germany .......................... 196 42 264

[51] Int. Cl.⁶ ...................................................... H04J 3/06
[52] U.S. Cl. ............................................ 370/508; 370/503
[58] Field of Search ...................................... 370/508, 503, 370/519, 514, 520, 403, 404, 452, 459, 460, 350; 375/354, 356; 455/502

[56] References Cited

U.S. PATENT DOCUMENTS

| | | | |
|---|---|---|---|
| 4,596,025 | 6/1986 | Satoh | 370/445 |
| 5,107,490 | 4/1992 | Wilson | 370/452 |
| 5,363,373 | 11/1994 | Nakamura | 370/519 |
| 5,379,299 | 1/1995 | Schwartz | 370/519 |

*Primary Examiner*—Ajit Patel
*Assistant Examiner*—Ricardo M. Pizarro
*Attorney, Agent, or Firm*—Herbert L. Lerner; Laurence A. Greenberg

[57] ABSTRACT

A method for compensating for propagation time delays in a communication network includes connecting each of a plurality of subscribers to a ring feeder for a common transmission of digital source data and control data in a data stream synchronous with a clock signal. The source and control data are transmitted in a format prescribing a pulsed sequence of individual bit groups of identical length containing component bit groups each forming a data channel for source data or control data. At least two subscribers, which are connected at different locations to the ring feeder, receive source data that are transmitted by one of the subscribers on different data channels and are correlated with one another. Specific bit positions are reserved in each bit group for a numerical value relayed from subscriber to subscriber. The numerical value is always set by one of the subscribers to a fixed initial value and incremented by each following subscriber along the ring feeder. Propagation time differences in the mutually correlated source data are compensated for on the basis of the numerical value.

18 Claims, 1 Drawing Sheet

METHOD FOR COMPENSATING FOR PROPAGATION TIME DELAYS IN AN ANNULAR COMMUNICATION NETWORK

BACKGROUND OF THE INVENTION

FIELD OF THE INVENTION

The invention relates to a method for compensating for propagation time delays in a communication network having a plurality of subscribers which are each connected to a ring feeder for the common transmission of digital source data and control data in a data stream synchronous with a clock signal, the source data and control data are transmitted in a format which prescribes a pulsed sequence of individual bit groups of identical length that contain component bit groups which in each case form a data channel for source data or control data, and at least two subscribers, which are connected at different locations to the ring feeder, receive source data that are transmitted by one of the subscribers on different data channels and are correlated with one another. The invention also relates to such a method used in a mobile communication system, in particular a communication system in a motor vehicle.

Such an annular communication network as is described, for example, in Published, European Patent Application 0 725 522 A1 serves for networking different types of electric and electronic devices which are intended to exchange information among one another in a partly complicated way, with the aid of data lines of physically simple construction. The subscribers can exchange both source data and control data through such data lines. For example, in the audio field it is possible to transmit audio data from data sources such as CD players, radio receivers and cassette recorders to data sinks such as amplifier/loudspeaker combinations, and control data can be transmitted at the same time, for example in order to control volume. In such a case, a device can be constructed simultaneously as a data source and a data sink, such as is the case with a cassette recorder, for example.

A certain delay is necessarily produced in each subscriber when reading out the source data and control data from the ring feeder, subjecting them to intermediate repetition and processing and reading them into the ring feeder again. That signal delay is particularly problematic when a subscriber transmits different source data which are mutually correlated in time and are received by different subscribers that are connected at different locations on the ring feeder. That is the case, for example, for devices in entertainment electronics which supply at least two amplifier/loudspeaker combinations with audio signals on a plurality of separate channels, two in the case of stereophony.

Although the delay in each subscriber can be restricted technically to a few tens of microseconds, in the case of a plurality of loudspeakers distributed in the network, which are separated by a plurality of other subscribers, the signal delays in the individual subscribers can add up to a magnitude which can cause a loss of the stereo impression or other spatial impressions, or even give rise to an unpleasant auditory impression. However, even if the signal delay is so small that no impairment of the stereo effect is perceived, more recent methods for generating three-dimensional auditory impressions such as, for example, pseudo stereophony would be ruled out.

In a communication network of the type described above it is complicated to compensate for the signal delays which occur. A particular advantage of such a network resides specifically in its flexibility with regard to cable laying, and the way in which further subscribers can be inserted as desired without changing the circuitry of the remaining system. In order not to lose that advantage, the positions of the current data source and the data sinks associated therewith have previously been determined in top protocol layers of the communication controller, something which has required a multiplicity of messages to be exchanged between subscribers with the aid of control data. The number of subscribers between the data source and the data sinks or between the individual data sinks can be calculated from the positions determined in that way.

Since the signal delay is known for each individual subscriber, it is then possible to calculate corresponding forced delays with which the mutually correlated signals can be correctly reproduced. Those delays can be subsequently reduced in any known way, for example by brief intermediate storage of the source data in the data sinks.

SUMMARY OF THE INVENTION

It is accordingly an object of the invention to provide a method for compensating for propagation time delays in an annular communication network, which overcomes the hereinafter-mentioned disadvantages of the heretofore-known methods of this general type and which can be used to compensate for propagation time delays of source data in an annular communication network in a simple way.

With the foregoing and other objects in view there is provided, in accordance with the invention, a method for compensating for propagation time delays in a communication network, which comprises connecting each of a plurality of subscribers to a ring feeder for common transmission of digital source data and control data in a data stream synchronous with a clock signal; transmitting the source data and control data in a format prescribing a pulsed sequence of individual bit groups of identical length containing component bit groups each forming a data channel for source data or control data; receiving source data transmitted by one of the subscribers on different data channels and correlated with one another, at least at two subscribers connected at different locations to the ring feeder; reserving specific bit positions in each bit group for a numerical value relayed from subscriber to subscriber; always setting the numerical value to a fixed initial value with one of the subscribers and incrementing the numerical value with each following subscriber along the ring feeder; and compensating for propagation time differences in mutually correlated source data on the basis of the numerical value.

The interfaces which connect the individual electric or electronic devices to the ring feeder are frequently of identical construction, with the result that each subscriber causes data streams transmitted through the ring feeder to be delayed by the same amount. In this case, the numerical value is respectively incremented by one, starting from an initial value of zero, for example.

However, the invent ion can also be applied in cases in which the subscribers delay the data stream by different time intervals. For this purpose, these time intervals are set either as an integral multiple of a fixed minimum delay, or a small time unit is fixed in such a way that its multiples can be used to specify arbitrary delays with sufficient accuracy. Each subscriber then increments the numerical value by the value which corresponds to its own delay.

In the preferred embodiment of the invention, the delay of the source data is compensated for at the receiving end, that is to say by compensating for the source data, or any signals derived therefrom, inside subscribers which receive the source data. However, compensation is also possible as an alternative at the transmitting end by transmitting the source data offset in time in such a way that they reach the receivers that are correctly correlated in time.

The numerical value is preferably set to the initial value by a subscriber that generates the clock signal to which all of the other subscribers conform. This subscriber, which is also referred to below as a clock pulse generator, is preferably the subscriber which is firstly switched on in the communication system. Since this subscriber is unique, complicated decision processes as to which subscriber has to reset the numerical value are eliminated. However, it is also possible as an alternative for the numerical value to be, for example, reset by the subscriber which transmits the mutually correlated source data. This can be expedient, for example, in cases in which the communication system contains only a single subscriber, that transmits mutually correlated data, for example a radio/cassette recorder/CD player combination, and no further such subscribers are provided.

In order to calculate the forced delays to be set, it is also useful to know the total number of subscribers in the communication network. It is certainly possible, in principle, to proceed from the maximum possible total number, but under some circumstances substantially longer forced delays than necessary are produced, and these demand greater outlay in the form of intermediate memories or the like. The total number of the subscribers can be determined in a simple way by the clock pulse generator, specifically from the numerical value it receives. In the case in which the numerical value is set to zero by the clock pulse generator and is incremented by one by each following subscriber, the total number of the subscribers is the numerical value received by the clock pulse generator plus one. The total number of the subscribers in the communication network can be disseminated cyclically by the clock pulse generator over the ring feeder and/or communicated to the subscribers on request.

The smallest possible forced delays in a specific system configuration are achieved when in each case the last in a series of source data receivers is not delayed at all and the receivers upstream of this receiver are delayed in accordance with their distance from the last receiver. In order to be able to carry out these calculations for arbitrary system configurations and system changes, there is also a requirement for information regarding the position of these subscribers in the network. This information is preferably managed by the clock pulse generator and disseminated through the ring feeder or communicated to the subscribers on request, at regular time intervals.

In this way, each receiver of source data correlated with other source data can extract from the cyclically disseminated information the information which it requires in addition to the numerical value or the total number of subscribers, or can request it from the clock pulse generator. Calculating the forced delays to be set can then be performed decentrally in the respective receivers of correlated source data.

As an alternative or in addition thereto, a subscriber which transmits mutually correlated source data to different subscribers can communicate its position to the receivers, and/or a plurality of receivers which receive mutually correlated source data can communicate their positions in the communication network and/or their closed-circuit condition to one another through the ring feeder. In this way, each receiver can obtain the information it requires without having to request it of the clock pulse generator or to extract the information disseminated by the clock pulse generator.

The method according to the invention is particularly suitable for compensating for propagation time differences between audio data fed to a plurality of data sinks, but it is not restricted thereto. For example, propagation time differences can be compensated for in the case of signals which are transmitted through the network by sensors for monitoring the operational states of motor vehicle components, in order to permit simple online comparison of those signals.

The ring feeder is preferably formed by optical fibers which interconnect two subscribers in each case, and permit high data transmission rates. Moreover, in the case of a communication system in a motor vehicle the low weight of optical fibers is particularly advantageous. However, the invention is also suitable for purely electric annular communication networks in which the line sections are, for example, coaxial cables.

Other features which are considered as characteristic for the invention are set forth in the appended claims.

Although the invention is illustrated and described herein as embodied in a method for compensating for propagation time delays in an annular communication network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
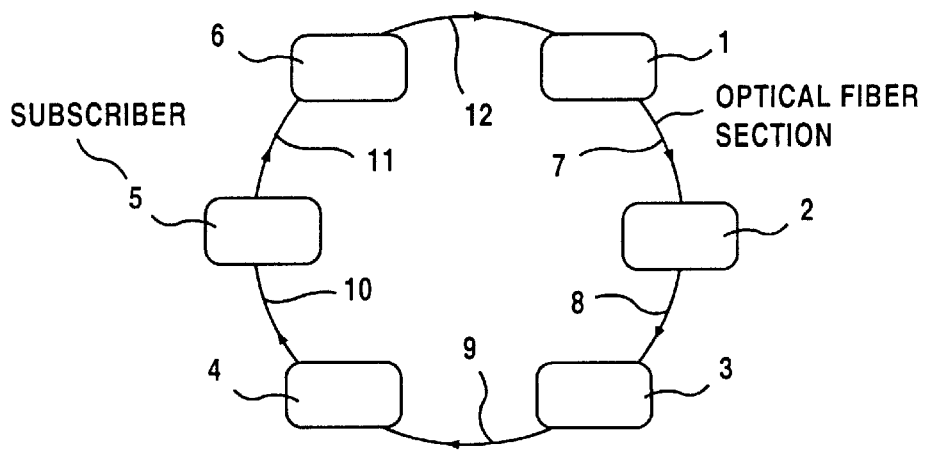
FIG. 1 is a block circuit diagram of an annular communication network with six subscribers.

Referring now to the figures of the drawings in detail and first, particularly, to FIG. 1 thereof, there is seen an annular network with a subscriber 1 operating as a clock pulse generator, and five further subscribers 2, 3, 4, 5 and 6. The six subscribers 1 to 6 are interconnected annularly through optical-fiber sections 7 to 12. The optical-fiber sections 7 to 12 thus form a ring feeder or ring cable for data transmission between the various subscribers. The physical direction of the data transmission is represented by arrows on the optical-fiber sections 7 to 12.

The subscriber 1 may, for example, be a radio receiver, the subscriber 4 may be a CD player, and the subscribers 2, 3, 5 and 6 may be active loudspeakers. Such a network can, for example, be installed in a motor vehicle and contain further devices in addition to the devices mentioned above. Such a complex multimedia network also contains, for example, a control and display unit, a telephone, a fax machine, a navigation system, a control unit for an air conditioner, a monitoring device for tire air pressure and a video camera.

These devices communicate with one another only through the ring feeder formed from the optical-fiber sections. This permits a data transmission format that prescribes a pulsed sequence of individual bit groups of identical length in which specific bit positions are respectively reserved for source data and control data, with the regions reserved for the source data forming a coherent region within a bit group. The source data and control data are transmitted through the ring feeder in a continuous data stream which is synchronous with a clock signal. The clock signal is generated by a single subscriber. All of the other subscribers are synchronized with this clock signal. Purely asynchronous data transmission methods such as packet-oriented data transmission methods, for example the ATM method, are to be distinguished therefrom.

The region of a bit group which is reserved for the source data is subdivided into a plurality of component bit groups of identical length which respectively form a data channel for source data. In the example shown in FIG. 1, two data channels are reserved for the stereo channels of the radio receiver 1 or the CD player 4, with the loudspeakers 2 and 5, for example, being assigned to the right-hand stereo channel, and the loudspeakers 3 and 6 being assigned to the left-hand stereo channel. The loudspeakers 2 and 3 are installed, for example, in the front doors of a motor vehicle, and the loudspeakers 5 and 6 are installed in the rear part of the car.

Figure 2:
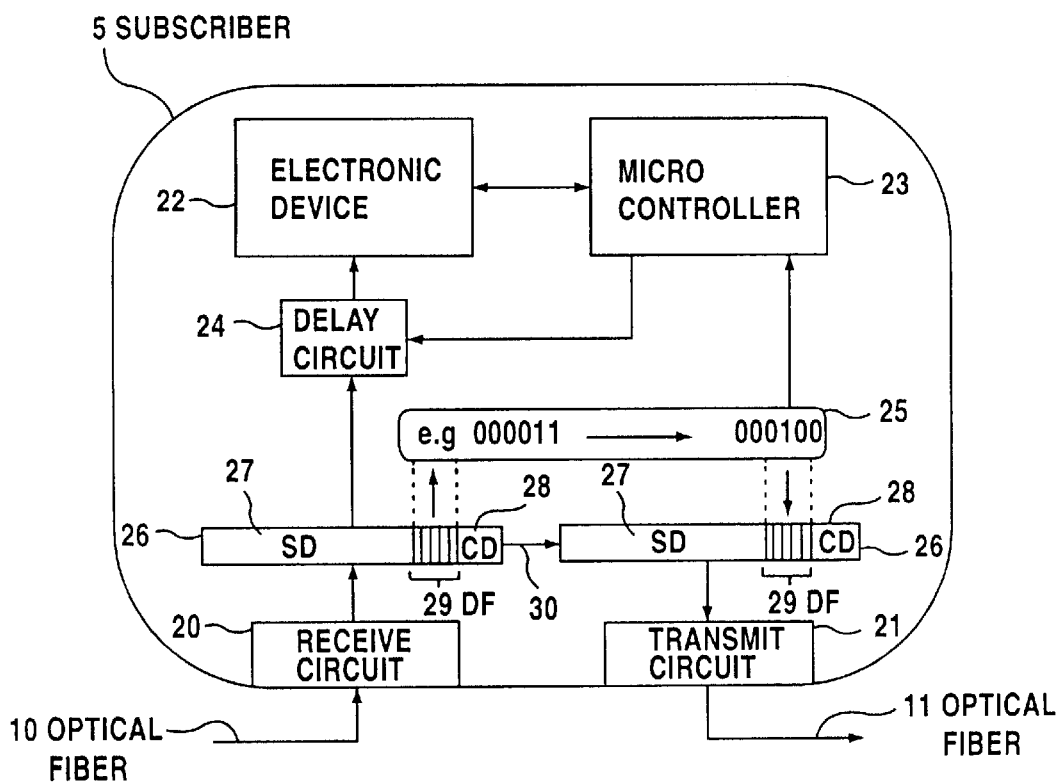
FIG. 2 is a detailed block circuit diagram of an individual subscriber, in which a bit group format used in data transmission is illustrated diagrammatically.

FIG. 2 shows one of the subscribers of FIG. 1 in more detail, the subscriber 5 in this example. The subscriber 5 includes a receive circuit 20 which is connected to the optical-fiber section 10 and contains an optoelectronic transducer for converting optical signals into electric signals, a transmit circuit 21 which is connected to the optical-fiber section 11 and contains an optoelectronic transducer for converting electric signals into optical signals, an electronic device 22 which is an amplifier/loudspeaker combination in the case of the subscriber 5, a microcontroller 23, that is to say a microprocessor for special control tasks, a controllable delay circuit 24 which contains intermediate memories, and an incrementer 25.

Received and transmitted bit groups 26 are each illustrated diagrammatically above a respective one of the receive circuit 20 and the transmit circuit 21. Each bit group 26 contains, inter alia, a region 27 for source data, a region 28 for control data and a data field 29 which includes six bits that represent a numerical position value.

The bit group 26 received from the optical-fiber section 10 is transferred with a fixed delay from the receive circuit 20 to the transmit circuit 21 and retransmitted into the optical-fiber section 11. During the transfer between the receive circuit 20 and the transmit circuit 21, the bit group 26 traverses a circuit of some sort which selectively permits instances of read and/or write access to the data in the bit group 26. Suitable circuits to be used for this purpose are, for example, shift registers, buffers or FIFO circuits. The bit group 26 traverses the subscriber 5 for the most part unchanged or in a transparent manner, as is represented by an arrow 30.

That part of the source data from the region 27 of the bit group 26 which is intended for the amplifier/loudspeaker combination 22 is fed through the delay circuit 24 to the amplifier/loudspeaker combination 22. The data from the data field 29 are fed to the incrementer 25, which increments the numerical position value by one and then reinserts it into the data field 29 before the latter is transmitted. The numerical position value is set to "000000" with each pass by one of the subscribers 1 to 6, specifically that subscriber which operates as a clock pulse generator. In this example, that may be the subscriber 1, with the result that the subscriber 5 receives the numerical position value "000011" and transmits the numerical position value "000100". The subscriber 5 is assigned the transmitted numerical position value "000100" or the decimal "4", and this numerical position value is fed to the microcontroller 23 for evaluation. The microcontroller 23 can moreover receive or transmit control data through the region 28 and is connected to the amplifier/loudspeaker combination 22 and to the delay circuit 24.

The remaining subscribers in the network have essentially the same structure as the subscriber 5 shown in FIG. 2, except that some subscribers write source data into the region 27. In this case, these are the subscribers 1 and 4, which transmit two-channel audio data. Each subscriber 1 to 6 delays a bit group 26 traversing the network by the same time interval T which is essentially determined by the times that are required for the optoelectronic signal conversion, the intermediate amplification, the read or write operations, and ensuring synchronization. In a typical communication network with a ring structure and optical fibers, the time interval T is approximately 44 $\mu$s. In the case of 64 possible subscribers, corresponding to the six bits of the data field 29, the result is a total delay of approximately 2.8 $\mu$s in the case of a pass through the network.

Reference is made both to FIG. 1 and to FIG. 2 for the purpose of describing the method for compensating for the different times at which the audio data arrive at the individual loudspeakers 2, 3, 5 and 6.

It may be assumed that the radio receiver 1 is currently transmitting data which are being received by the loudspeakers 2, 3, 5 and 6. As was described above, the microcontroller 23 of the loudspeaker 5 receives the numerical position value "4". It also receives the following information disseminated cyclically on the network from the clock pulse generator through the region 28 for control data: the numerical position value of the clock pulse generator, which is "0"; the total number of the subscribers on the network, which is the numerical position value that the clock pulse generator receives from the loudspeaker 6, plus 1, that is to say the total number "6"; and the positions of the remaining loudspeakers 2, 3 and 6 on the network, that is to say the positions "1", "2" and "5".

Using this information, the microcontroller 23 calculates that the loudspeaker which is last in the transmission direction upstream of the transmitting subscriber, that is the radio receiver 1, is the loudspeaker 6, and that the loudspeaker 5 is in a position upstream of the loudspeaker 6. From this, the microcontroller 23 calculates that the audio data in the loudspeaker 5 must be delayed by the time interval T, and correspondingly controls the delay circuit 24 upstream of the amplifier/loudspeaker combination 22.

In a similar way, it is determined in the loudspeaker 3 that the audio data are to be delayed by a time interval 3T. The audio data are delayed correspondingly by the time interval 4T in the loudspeaker 2, and the loudspeaker 6 relays the audio data undelayed. The audio data are then reproduced with the correct temporal correlation by all of the loudspeakers 2, 3, 5 and 6.

The position information which is required to calculate the delay to be set is based in each case wholly or partly on the numerical position value anchored in the bit group and relayed from subscriber to subscriber. The numerical position value is automatically updated continuously, so that a new subscriber can enter the ongoing operation of the system without the occurrence of erroneous ring positions. Other information, relating to the type of a specific subscriber, for example, can be updated, for example, when initializing the system or turning a subscriber on or off. Consequently, both the current sound source and the physical system configuration can be changed at any time as desired without the need for complicated network management routines.

If, for example, the loudspeakers 5 and 6 are removed from the system, with the ring needing to be reclosed between the subscribers 4 and 1, the microcontrollers of the remaining loudspeakers 2 and 3 receive the same numerical position value on the basis of the position information which is automatically updated continuously, but obtain changed position data from the clock pulse generator 1. Using these new data, the microcontroller calculates in the loudspeaker 3 that the latter is the last loudspeaker upstream of the transmitter of the audio data which need not be delayed, and the loudspeaker 2 delay s the sound reproduction by the time interval T.

When the loudspeakers 5 and 6 are added again, the previous state is set up again automatically on the basis of the position information that is automatically updated continuously.

If the CD player 4 is selected instead of the radio receiver 1 as the current sound source, with the radio receiver 1 continuing to be the clock pulse generator if it is not switched off, the loudspeaker 3 becomes the last loudspeaker upstream of the transmitter of the audio data. The loudspeaker 3 then imposes no delay, the loudspeaker 2 imposes a delay by the time interval T, the loudspeaker 6 imposes a delay by the time interval 3T, and the loudspeaker 5 imposes a delay by the time interval 4T. It is noted in this case that the clock pulse generator is situated between two loudspeakers. Whether this circumstance must be considered when calculating the time delay periods depends on the mode of calculation used in the individual case.

The above-mentioned calculations are very simple with the exception of the process for determining which of the subscribers in the transmission direction is the last loudspeaker in the ring feeder upstream of the currently selected transmitter of audio data. The calculations require no special "intelligence" in the form of a program-controlled microprocessor, but can also be carried out by logic circuits, that is to say by hardware. Consequently, the loudspeakers 2, 3, 5 and 6 do not necessarily require a microcontroller. Rather, the calculations mentioned above can be carried out entirely or partly by the microcontroller of the clock pulse generator, which generally manages the information relating to the positions of all of the subscribers on the network, that are generally still required for further purposes. The clock pulse generator can set the required delays at the loudspeakers located in the system by directly driving their delay circuits. This can be performed, for example, with the aid of special instruction codes which require no interpretation by an instruction interpreter of a microcontroller, but are detected in hardwired instruction decoders of the loudspeakers.

A further possibility for reducing the outlay on computation and communication, which is relatively low in any case, resides in the fact that the loudspeakers or other subscribers which receive mutually correlated data such as, for example, audio data, communicate directly with one another in order to exchange information regarding their position on the network. The transmitter of the correlated data can also be incorporated into this communication.

We claim:

1. A method for compensating for propagation time delays in a communication network, which comprises:

connecting a plurality of subscribers to a ring feeder for common transmission of digital source data and control data in a data stream synchronous with a clock signal;

transmitting the source data and control data in a format prescribing a pulsed sequence of individual bit groups of identical length containing component bit groups each forming a data channel for source data or control data;

receiving source data transmitted by one of the subscribers on different data channels and correlated with one another, at least at two subscribers connected at different locations to the ring feeder;

reserving specific bit positions in each bit group for a numerical value relayed from one subscriber to another subscriber;

always setting the numerical value to a fixed initial value with one of the subscribers and incrementing the numerical value with each following subscriber along the ring feeder; and compensating for propagation time differences in mutually correlated source data on the basis of the numerical value.

2. The method according to claim 1, which comprises delaying the source data and control data by an identical time interval with each subscriber, and incrementing the numerical value by one in each case.

3. The method according to claim 1, which comprises compensating for propagation time differences in the mutually correlated source data with a corresponding time delay in source data received on specific data channels.

4. The method according to claim 1, which comprises setting the numerical value to the initial value with a subscriber generating the clock signal.

5. The method according to claim 4, which comprises:

determining a total number of subscribers in the communication network with the subscriber generating the clock signal, from the numerical value received by the subscriber generating the clock signal; and propagating the total number of the subscribers at regular time intervals over the ring feeder, and communicating the total number of the subscribers to the subscribers on request, with the subscriber generating the clock signal.

6. The method according to claim 4, which comprises:

determining a total number of subscribers in the communication network with the subscriber generating the clock signal, from the numerical value received by the subscriber generating the clock signal; and propagating the total number of the subscribers at regular time intervals over the ring feeder, with the subscriber generating the clock signal.

7. The method according to claim 4, which comprises:

determining a total number of subscribers in the communication network with the subscriber generating the clock signal, from the numerical value received by the subscriber generating the clock signal; and communicating the total number of the subscribers to the subscribers on request, with the subscriber generating the clock signal.

8. The method according to claim 4, which comprises:

managing information regarding the positions of all of the subscribers in the communication network with the subscriber generating the clock signal; and propagating the information cyclically through the ring feeder and communicating the information to the subscribers on request, with the subscriber generating the clock signal.

9. The method according to claim 4, which comprises:

managing information regarding the positions of all of the subscribers in the communication network with the subscriber generating the clock signal; and propagating the information cyclically through the ring feeder, with the subscriber generating the clock signal.

10. The method according to claim 4, which comprises:

managing information regarding the positions of all of the subscribers in the communication network with the subscriber generating the clock signal; and communicating the information to the subscribers on request, with the subscriber generating the clock signal.

11. The method according to claim 1, which comprises communicating a position in a communication network, of a subscriber transmitting the mutually correlated source data to different subscribers, through the ring feeder to the different subscribers.

12. The method according to claim 1, which comprises communicating a position in the communication network of the plurality of subscribers receiving the mutually correlated source data, and communicating through the ring feeder a closed circuit condition of the plurality of subscribers receiving mutually correlated source data.

13. The method according to claim 1, which comprises communicating a position in the communication network of the plurality of subscribers receiving the mutually correlated source data.

14. The method according to claim 1, which comprises communicating through the ring feeder a closed circuit condition of the plurality of subscribers receiving the mutually correlated source data.

15. The method according to claim 1, which comprises defining the mutually correlated source data as multichannel audio data.

16. The method according to claim 1, which comprises forming the ring feeder of optical fibers each interconnecting a respective two of the subscribers.

17. A method for compensating for propagation time delays in a mobile communication system, which comprises:

connecting a plurality of subscribers to a ring feeder of a mobile communication system for common transmission of digital source data and control data in a data stream synchronous with a clock signal;

transmitting the source data and control data in a format prescribing a pulsed sequence of individual bit groups of identical length containing component bit groups each forming a data channel for source data or control data;

receiving source data transmitted by one of the subscribers on different data channels and correlated with one another, at least at two subscribers connected at different locations to the ring feeder;

reserving specific bit positions in each bit group for a numerical value relayed from one subscriber to another subscriber;

always setting the numerical value to a fixed initial value with one of the subscribers and incrementing the numerical value with each following subscriber along the ring feeder; and compensating for propagation time differences in mutually correlated source data on the basis of the numerical value.

18. A method for compensating for propagation time delays in a communication system in a motor vehicle, which comprises:

connecting a plurality of subscribers to a ring feeder of a communication system in a motor vehicle for common transmission of digital source data and control data in a data stream synchronous with a clock signal;

transmitting the source data and control data in a format prescribing a pulsed sequence of individual bit groups of identical length containing component bit groups each forming a data channel for source data or control data;

receiving source data transmitted by one of the subscribers on different data channels and correlated with one another, at least at two subscribers connected at different locations to the ring feeder;

reserving specific bit positions in each bit group for a numerical value relayed from one subscriber to another subscriber;

always setting the numerical value to a fixed initial value with one of the subscribers and incrementing the numerical value with each following subscriber along the ring feeder; and compensating for propagation time differences in mutually correlated source data on the basis of the numerical value.

* * * * *